2,836,541

MANNITOL STABILIZED MORPHINE-PAPAVERINE COMPOSITION

Roger K. Lager, East Greenbush, N. Y., assignor to Sterling Drug Inc., New York, N. Y., a corporation of Delaware No Drawing. Application December 4, 1953
Serial No. 396,329

1 Claim. (Cl. 167—67)

This invention relates to an aqueous solution containing morphine and papaverine, suitable for injection, and stabilized against deterioration and discoloration.

In the emergency treatment of cardiac insufficiencies it is customary for the physician to administer morphine to relieve the pain of angina and papaverine to relax the cardiac muscle. However, the physician in the past has been obliged to inject the morphine solution and the papaverine solution separately because it has not proved possible in the past for pharmaceutical manufacturers to provide a single solution containing both alkaloids and stabilized against deterioration and discoloration. The drawbacks inherent in the necessity of making two separate injections, one for morphine and another for papaverine, are obvious. The drawbacks include delays at a critical time, inconvenience both to the physician and the patient, and the doubling of the risks inherent in the mechanics of injection.

Part of the difficulty attendant to attempting the formulation of a single, combined solution of morphine and papaverine lies in the fact that it has always been thought necessary to protect aqueous solutions of morphine against deterioration by incorporating an antioxidant such as sodium bisulfite, sodium metabisulfite, sodium hypophosphite or the like; yet when such antioxidants are combined with papaverine the latter is gradually destroyed with discoloration and formation of precipitates, rendering impossible the use of such solutions for injection purposes.

Now I have found that a stable aqueous solution containing both morphine and papaverine, and adapted for injection, can be prepared if there is incorporated in such a solution a few percent of mannitol. The mannitol serves as a stabilizing agent in some unknown fashion and the resulting solutions remain clear and colorless for a long time and are capable, as is necessary, of being sterilized by heating, without decomposition. While the amount of mannitol required is not critical I prefer to use a sufficient amount to make the solution isotonic.

My new stabilized aqueous solutions of morphine and papaverine are most conveniently supplied in single-dose all-glass ampules. Such ampules require no preservative since they can be heat-sterilized. However, my compositions can also be dispensed in vials sealed by rubber or like stoppers and such vialed preparations of my composition if of the multiple-dose type must of course then be provided with a preservative as required by the Pharmacopeia of the United States, such preservative being, for instance, benzyl alcohol, phenol, or chlorobutanol.

The following example will illustrate my invention without, however, limiting it thereto.

Example

The following formulation contains the following ingredients in the proportions indicated:

|  | Per cc. | Per liter |
|---|---|---|
| Morphine sulfate, U. S. P | 16.0 mg. | 16.0 gm. |
| Papaverine hydrochloride U. S. P | 32.0 mg. | 32.0 gm. |
| Mannitol | 30.0 mg. | 30.0 gm. |
| Water for injection, U. S. P., q. s. ad | 1.0 cc. | 1,000.0 cc. |

It is to be noted that in this formulation the morphine, the papaverine and mannitol are in the proportions by weight of about 1:2:2.

The water is freed of oxygen by bubbling nitrogen through it. Then the mannitol and papaverine hydrochloride are added to a volume of the water corresponding to nine-tenths of the total volume of desired final solution. After dissolution is complete the morphine sulfate is added and dissolved. Then the pH of the solution is adjusted to 3.8–3.9 by addition of 1 normal sodium hydroxide solution. More water is then added until the volume is brought to the desired value, following which the solution is filtered free of any particles. The solution can then be filled into ampules and these in turn sealed and sterilized, e. g., by autoclaving at 121° C. for fifteen minutes or by other recognized methods of sterilization. During all the manipulations it is necessary that the containers be flooded with nitrogen gas to avoid contacting the solution with oxygen or air.

What I claim is:

An aqueous solution containing morphine and papaverine, suitable for injection and stabilized against deterioration and discoloration, comprising morphine, papaverine and mannitol in the proportions by weight of about 1:2:2, the said solution being excluded from contact with atmospheric oxygen.

References Cited in the file of this patent

FOREIGN PATENTS 69,300    Austria _____ July 10, 1915

OTHER REFERENCES

Gutman: Modern Drug Encyclopedia, p. 683, entry "Spasmalgin," June 27, 1946.

J. A. M. A.: Vol. 139, No. 13, p. 895, Mar. 26, 1949, "Apomorphine Solutions."

Diehl: "Medicinal Treatments of the Common Cold," J. A. M. A., Dec. 23, 1933, pp. 2042–2049, esp. p. 2046, col. 2, "Morphine-Papaverine."

Speel: Mannitol and Sorbitol in Pharmacy, Am. J. Pharm., April 1941, pp. 134–141, esp. p. 140.